United States Patent [19]

Welschof

[11] 4,023,382
[45] May 17, 1977

[54] BALL CAGE FOR A CONSTANT VELOCITY UNIVERSAL JOINT

[75] Inventor: Hans-Heinrich Welschof, Rodenbach, Germany

[73] Assignee: Lohr & Bromkamp GmbH, Offenbach, Main, Germany

[22] Filed: June 23, 1975

[21] Appl. No.: 589,575

[30] Foreign Application Priority Data

June 22, 1974 Germany .......................... 2430025

[52] U.S. Cl. .......................................... 64/21; 64/8
[51] Int. Cl.² ............................................ F16D 3/30
[58] Field of Search ............................ 64/21, 8, 7

[56] References Cited

UNITED STATES PATENTS

| | | | |
|---|---|---|---|
| 2,313,279 | 3/1943 | Scczek | 64/21 |
| 3,522,714 | 8/1970 | Wildhaber | 64/21 |
| 3,785,172 | 1/1974 | Parsons | 64/21 |
| 3,875,762 | 4/1975 | Tampalini | 64/21 |

Primary Examiner—Benjamin W. Wyche
Assistant Examiner—Randall Heald
Attorney, Agent, or Firm—Edmund M. Jaskiewicz

[57] ABSTRACT

A constant velocity universal joint has outer and inner joint members with opposed grooves and balls in opposed pairs of the grooves to transmit torque. A cage between the joint members is provided with a number of radial openings to retain the balls in a plane which bisects the angle between the inner and outer joint members formed when the joint is bent and which is at right angles to the cage. The balls engage surfaces of the radial openings which are parallel with the plane and at least on one side of each ball there is provided a supporting plate which engages the ball by a concave spherical surface or a ball groove and which contacts a surface of the cage opening with a planar face. The balls may also be retained within the openings by means of a supporting ring which may be fixed in the opening or capable of movement therein.

8 Claims, 14 Drawing Figures

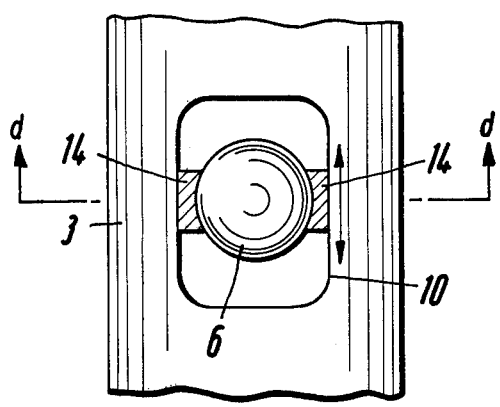
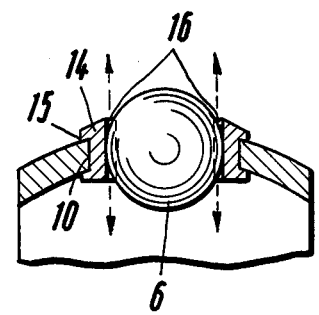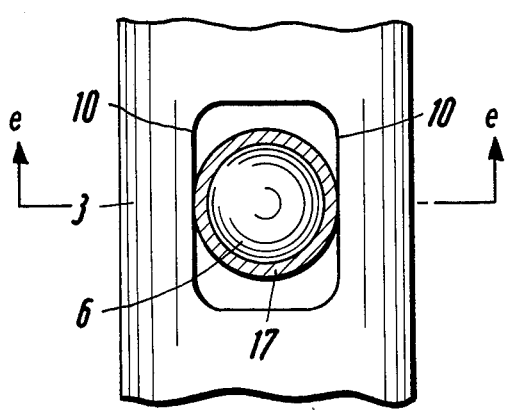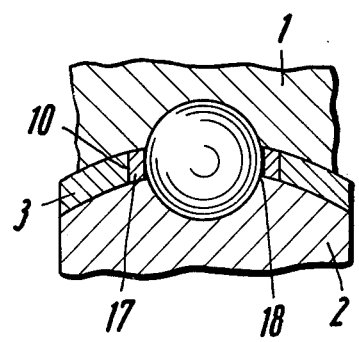

BALL CAGE FOR A CONSTANT VELOCITY UNIVERSAL JOINT

The present invention relates to constant velocity universal joints, more particularly, to the cage structure for retaining the balls between the outer and inner members.

One form of a constant velocity universal joint comprises a hollow joint member having an axial bore therethrough with a plurality of grooves in the surface of the bore. An inner joint member is positioned within the bore and has a corresponding number of grooves in its outer surface so positioned that the grooves in the inner and outer joint members form pairs of opposing grooves. A torque transmitting element in the form of a ball is positioned in each pair of opposed grooves. A ball retainer cage is positioned between the inner and outer joint members and comprises a number of radial openings for receiving the balls so as to maintain the balls in a plane which is perpendicular to the longitudinal axis of the cage and bisects the angle formed between the inner and outer joint members when the joint is bent. The balls contact surfaces of the openings which are parallel with said plane.

In such a constant velocity joint the torque transmitting balls are supported on plane surfaces of the cage openings. The contact between a ball and a plane surface is a point or spot contact which produces high compression localized stresses. These high stresses quite often lead to plastic deformation which in turn result in increased cage wear. The cage which itself does not transmit any torque thus constitutes a weak point in the constant velocity universal joint assembly.

Attempts have been made to absorb such high compression stresses by hardening these surfaces of the cage, but to date these efforts have been unsuccessful. This lack of success appears to be due primarily to the comparatively thin thickness of the wall of the cage. Since the depth to which a surface is hardened must exceed a quarter of the total wall thickness, the cage structure becomes very brittle and has a tendency to fracture easily. A further disadvantage is that the point of contact between the ball and cage opening is displaced radially outwardly with increased angles of joint bending and thus imposes an additional limit on the magnitude of the bending angle of the joint.

It is therefore the principal object of the present invention to provide an improved constant velocity universal joint which eliminates any weakness at the point of contact between a ball and a surface of the ball retainer cage.

It is another object of the present invention to provide such a constant velocity universal joint which has a greater bending angle and increased torque capacity.

It is a further object of the present invention to provide such a constant velocity universal joint wherein the spherical shape of the ball torque transmitting elements is maintained in order to enable the balls to perform a rolling movement in the joint with a minimum of friction losses.

The present invention is embodied in a constant velocity universal joint comprising an outer joint element having a bore therethrough and a plurality of grooves in the surface of the bore. An inner joint element is positioned within the bore and has a plurality of grooves in its outer surface corresponding in number to and opposite from the outer element grooves so as to define pairs of opposed grooves. A plurality of balls for transmitting torque are positioned between the joint elements with each ball being in a pair of opposed grooves. A cage is positioned between the joint elements and has a plurality of radial openings therein to retain the balls in a plane bisecting the angle between the outer and inner elements when the joint is bent and perpendicular to the axis of the cage. The balls engage surfaces on the openings which are parallel with the ball plane. According to one aspect of the present invention a supporting plate is positioned between each ball and a portion of the opening surface contacted by the ball and parallel to the ball plane. The supporting plate has a plane surface engaging the opening surface and may have a concave spherical surface or a groove engaging the ball.

According to another aspect of the invention the cage openings may have surfaces parallel to the ball plane and each ball in an opening engaging two of the parallel opening surfaces. A supporting ring is positioned in an opening between surfaces thereof and coaxially surrounds each ball. The ring has an outer surface contacting opposed ones of the opening surfaces and may have either a concave or a cylindrical surface on its inner face contacting the ball. The distance across the ring outer surface, or if the outer surface is cylindrical the diameter, is substantially equal to the distance between the opposed opening surfaces contacted by the ring.

One advantage of the present invention is that a linear contact and also a planar or surface area contact can be achieved between the ball and the supporting plate or ring. The same contact can also be obtained between the supporting plate or ring and the associated surface of the cage. The increased support between the supporting plate or ring and the opening surface permits an increase in the magnitude of the potential bending angle of the joint since the radial range of movement of the ball is increased without any risk of localized compression stresses at the cage opening or of jamming of the balls.

Other objects and advantages of the present invention will be apparent upon reference to the accompanying description when taken in conjunction with the following drawings, which are exemplary, wherein;

FIG. 3b is a sectional view taken along the line B—B of FIG. 3a;

FIG. 6b is a sectional view taken along the line C—C of FIG. 6a

FIG. 7a is similar to that of FIG. 3a and showing yet another modification of a supporting plate;

FIG. 7b is a sectional view taken along the line D—D of a FIG. 7a;

FIG. 8a is a view similar to that of FIG. 3a and showing a supporting ring according to the present invention; and FIG. 8b is a sectional view taken along the line E-E and further showing sections of portions of the outer and inner joint elements.

Proceding next to the drawings wherein like reference symbols indicate the same parts throughout the various views a specific embodiment and modifications of the present invention will be described in detail.

Figure 1:
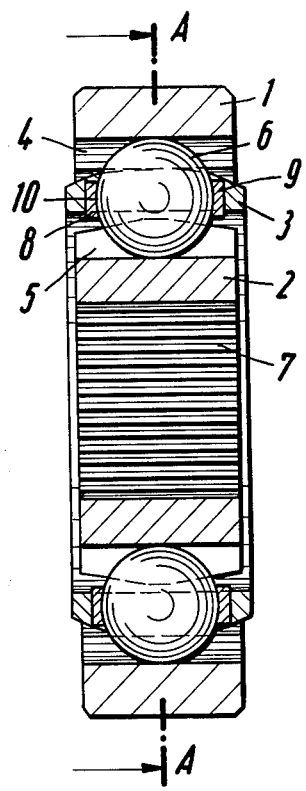
FIG. 1 is a longitudinal sectional view of a constant velocity universal joint incorporating the present invention.
Figure 2:
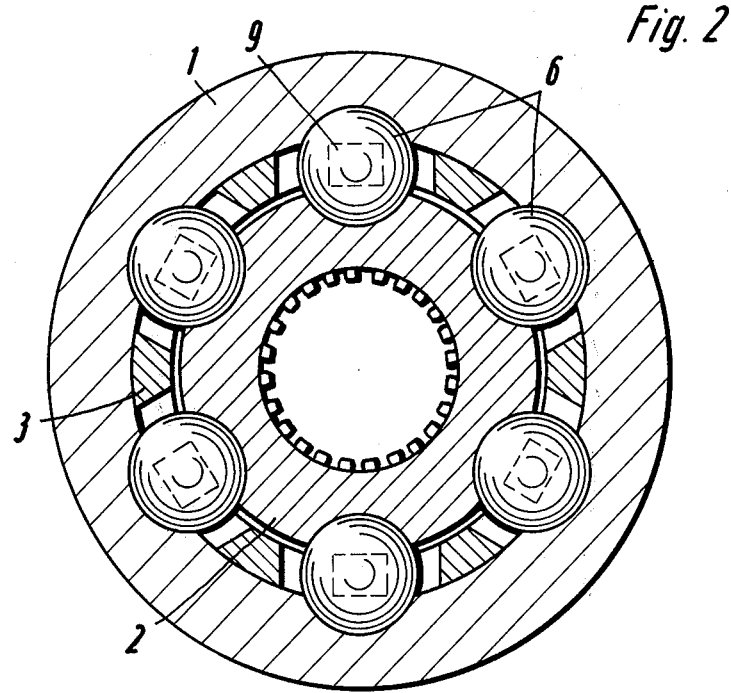
FIG. 2 is a sectional view taken along the line A—A of FIG. 1.

In FIGS. 1 and 2 there is shown a constant velocity universal joint embodying the present invention. This joint comprises an outer joint member 1 having a number of substantially axially extending tracks 4 formed in the surface of an axial bore passing through the outer joint member. An inner joint member 2 is positioned within the bore of the outer joint member and has a corresponding number of substantially axially extending tracks 5 in its outer surface. The grooves or tracks 4 and 5 are positioned opposite each other so as to form pairs of opposed tracks with balls 6 being retained in the pairs of opposed tracks.

While the grooves 4 and 5 are substantially axially extending the tracks may be positioned obliquely to the longitudinal axis of the joint wherein the joint is of the type where the grooves control or direct the balls directly into the homokinetic plane because of the conformation of the grooves. The homokinetic plane is the plane which bisects the angle between the inner and outer joints when the joint is bent. Opposed ones of the grooves 4 and 5 may cross or intersect each other, as described above, for the purpose of controlling the balls. The grooves 4 and 5 in the respective joint members 1 and 2 may all extend in the same direction or be alternately inclined.

The balls 6 are retained by a cage 3 positioned between the inner and outer joint members so as to absorb axial thrust forces arising from the inclination of the grooves. In this type of constant velocity universal joint the cage retains the balls in a plane which is perpendicular to the longitudinal axis of the cage 3.

The cage 3 is provided with a number of radial openings each of which has a parallel surface 10 which is engaged by a ball retained in the opening. The inner joint member is provided with an axially extending bore having splines 7 for connection to a driving or driven shaft. The outer joint member 3 is connected to the other of a driving or driven shaft by means of a flanged joint as known in the art.

The subject invention is preferably applied to those types of constant velocity universal joints which are controlled or aligned by the grooves or tracks. Various embodiments and modifications of the invention will be described in connection with such a joint and in connection with FIGS. 3–8.

Figure 3A:
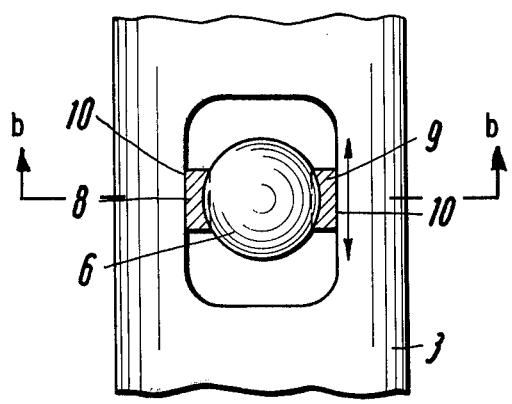
FIG. 3a is a top plan view of a portion of a cage and an opening therethrough showing supporting plates in section according to the present invention.
Figure 3B:
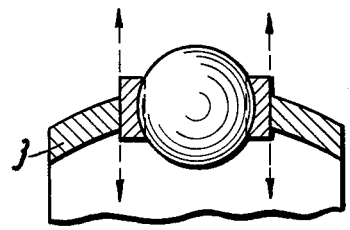
Figure 3C:
FIG. 3c is an overall perspective view of a supporting plate of FIGS. 3a and 3b.

As may be seen in FIGS. 1–3, supporting plates 8 and 9 are positioned on the right and left sides of balls 6 and bear against the associated surfaces of the cage openings. The side of each of supporting plate 8 and 9 facing the balls 6 has a concave configuration corresponding to the spherical surface of the ball. The side of supporting plates 8,9 engaging with the cage opening surface 10 is planar since, as can be seen in FIG. 3b, when the joint is bent the balls 6 are movable with respect to the cage 3 in a radial direction and as shown in FIG. 3a in the circumferential direction of the cage 3 or transversely to the axis of the joint.

Figure 4:
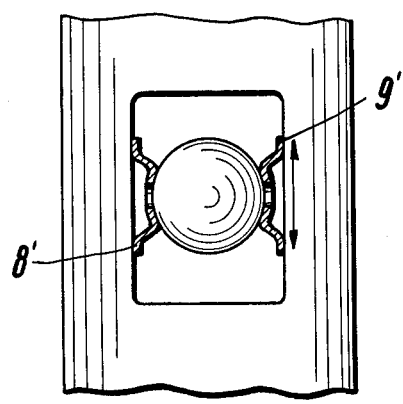
FIG. 4 is a view similar to that of FIG. 3a with a modified supporting plate.

In FIG. 4, the supporting plates 8' and 9' are formed of deep drawn sheet metal and are resilient.

Figure 5:
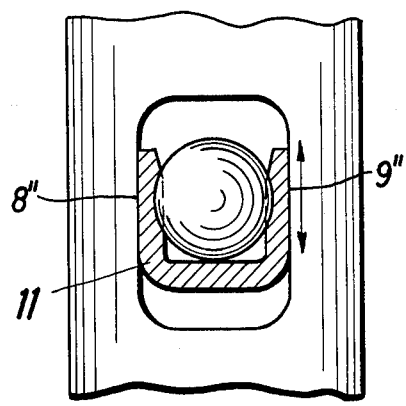
FIG. 5 is a similar view to that of FIG. 3a but showing a further modification of a supporting plate.

In the modification FIG. 5, supporting plates 8" and 9" which are similar to the supporting plates 8 and 9 of FIG. 3 are interconnected by a bracket to form a substantially U-shaped structure.

Figure 6A:
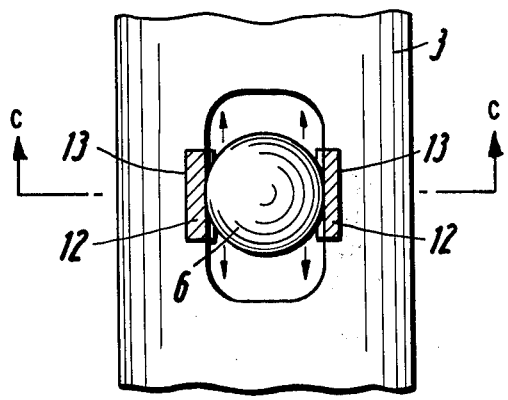
FIG. 6a is similar to that of FIG. 3a and shows a still further modification of a supporting plate.
Figure 6B:
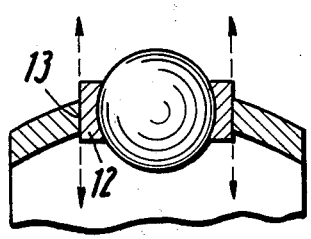
Figure 6C:
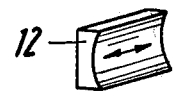
FIG. 6c is an overall perspective view of the supporting plate of FIGS. 6a and 6b.

In FIG. 6, there are shown supporting plates 12 which are formed with a groove on the sides facing the balls 6 so that the groove extends tangetially with respect to the circumferential direction of the cage 3. In the radial direction, the plates 12 are guided in slots 13 formed in the cage so as to be movable as shown in FIG. 6b. With this supporting plate structure, there is linear contact between the balls 6 and opposed supporting plates 12 instead of the surface of planar contact of FIG. 3. The required freedom of movement in the circumferential and radial directions is provided by the configuration of the supporting plates and the manner in which they are guided within the slots 13 formed in the cage 3.

FIG. 7 is a modification of FIG. 6 wherein the supporting plates are guided on the cage in the circumferential instead of the radial direction thereof. Supporting plates 14 are formed with grooves 15 within which are received the opening surfaces 10. The required degree of movability is provided by grooves 16 extending in the radial direction. This embodiment also provides linear contact between the balls 6 and opposed supporting plates 14 while planar or surface bearing contact is provided between the supporting plates 14 and the associated opening surfaces of the cage 3.

In FIG. 8, there is provided an annular or supporting ring 17 which is coaxially positioned around ball 6 and whose outer cylindrical surface is guided along the opening surfaces 10 of the cage 3. The ring 17 has an inner bore 18 of a diameter corresponding to that of the balls 6. The ring 17 thus provides linear contact between the balls 6 and the supporting ring in the circumferential direction of the ball and also provides linear contact in the radial direction between the outer surface of the ring 17 and the associated opening surface 10 of the cage 3.

The inner bore 18 of the ring 17 may have a concave configuration to correspond to the spherical surface of the balls 6 and thereby obtain planar or surface contact.

As described above, the supporting plate, particularly the drawn supporting plate shown in FIG. 4, may be made so as to be resilient. Such a resilient plate will provide freedom of play particularly under wider bending angles. Also under these wider bending angles there will be an attenuation or absorbtion effect when there is any variation in the contact between the ball and window surface from one side to the other. The result is quieter and smoother operation of the joint.

Thus it is apparent that the present invention has provided a universal joint wherein on at least one side of each ball in the region of contact between the ball and the cage opening surface extending parallel with the ball plane there isprovided a supporting or bearing plate having a concave partially spherical surface or groove for engaging the ball and having a plane surface engaging with the associated cage opening surface.

The present invention also provides for the balls to be coaxially surrounded by a supporting or bearing ring which is guided within the cage opening between the surfaces of the opening. The side of the ring facing the ball being concave or cylindrical to correspond to the diameter of the ball while the side of the ring directed toward the opening surface is cylindrical having a diameter corresponding to the relative spacing of mutually parallel surfaces of the cage opening. The ring may also have faces corresponding with the surfaces of the opening and which are relatively spaced apart by a distance equal to or less between those cage opening surfaces.

It will be understood that this invention is susceptible to modification in order to adapt it to different usages and conditions, and accordingly, it is desired to comprehend such modifications within this invention as may fall within the scope of appended claims.

What is claimed is:

1. A constant velocity universal joint comprising an outer joint element having a bore therethrough and a plurality of grooves in the surface of said bore, an inner joint element within said bore and having a plurality of grooves in its outer surface corresponding in number to and opposite from said outer joint element grooves to define pairs of opposed grooves, a plurality of balls between said joint elements with each ball being in a pair of opposed grooves, a cage between said joint elements and having a plurality of radial openings therein to retain said balls in a plane bisecting the angle between the outer and inner joint elements when the joint is bent and perpendicular to the axis of said cage, said openings having surfaces parallel with said plane and engaged by said balls, and a supporting plate between each ball and a portion of the opening surface contacted by each ball and parallel to each ball plane, said supporting plate having a plane surface engaging said opening surface and one of a concave spherical surface or a groove engaging said ball in surface or line contact respectively.

2. A constant velocity universal joint as claimed in claim 1 wherein said supporting plate has a groove extending perpendicularly to the longitudinal axis of said cage engaging a said ball and said support plate being movable perpendicularly to said longitudinal axis along said opening surface.

3. A constant velocity universal joint as claimed in claim 1 wherein said support plate has a groove extending parallel to the longitudinal axis of said cage engaging a said ball, said support plate being movable perpendicularly to said longitudinal axis along said opening surface.

4. A constant velocity universal joint as claimed in claim 1 and a pair of opposed support plates contacting each ball, and a U-shaped bracket interconnecting said pair of support plates.

5. A constant velocity universal joint as claimed in claim 1 wherein said support plate comprises a shaped sheet metal element.

6. A constant velocity universal joint as claimed in claim 5 wherein said support plate is resilient.

7. A constant velocity universal joint comprising an outer joint element having a bore therethrough and a plurality of grooves in the surface of said bore, an inner joint element within said bore and having a plurality of grooves in its outer surface corresponding in number to and opposite from said outer element joint grooves to define pairs of opposed grooves, a plurality of balls between said joint elements with each ball being in a pair of opposed grooves, a cage between said joint element and having a plurality of radial openings therein to retain said balls in a plane bisecting the angle between the outer and inner joint elements when when the joint is bent and perpendicular to the axis of said cage, said openings having surfaces parallel to said plane and each ball engaging two of said parallel opening surfaces, a supporting ring in an opening between surfaces thereof coaxially surrounding each ball, said ring having an outer surface contacting opposed ones of said opening surfaces and one of a concave or cylindrical surface on its inner face contacting a said ball in surface or line contact respectively, the distance across said ring outer surface being substantially equal to the distance between said ring opposed opening surfaces.

8. A constant velocity universal joint as claimed in claim 7 wherein said ring outer surface is cylindrical and has a diameter substantially equal to the distance between said ring opposed opening surfaces.

* * * * *